W. JANISZEWSKI.
BOILER.
APPLICATION FILED JULY 9, 1917.
1,255,014.
Patented Jan. 29, 1918.
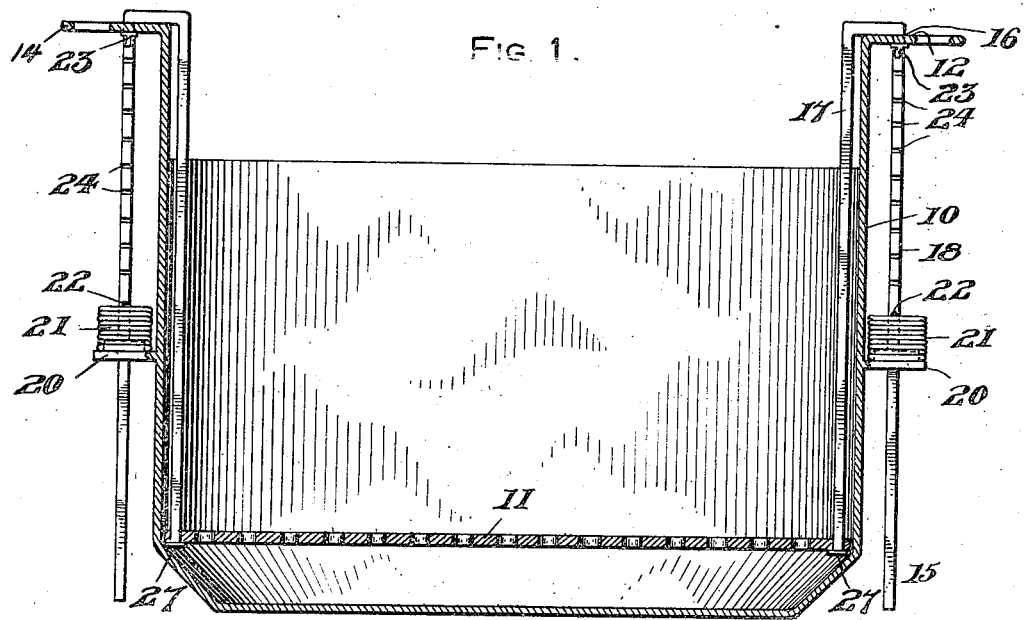
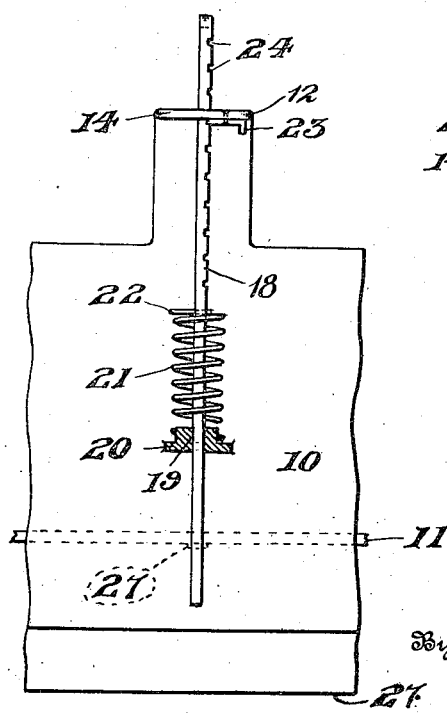
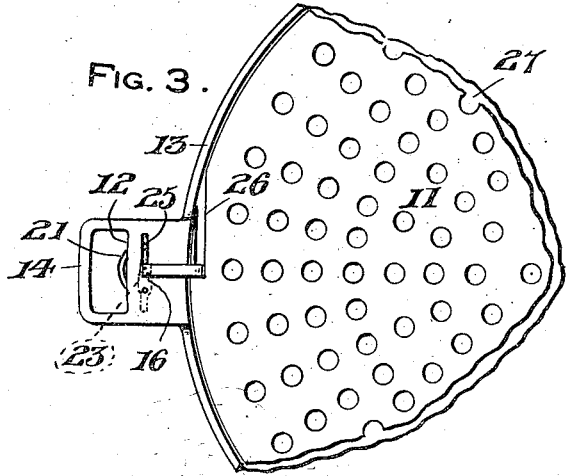
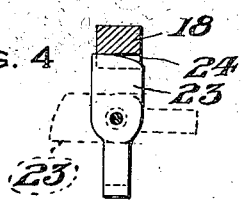
Inventor
W. Janiszewski
By N. M. Wilson
Attorney

UNITED STATES PATENT OFFICE.

WACLAW JANISZEWSKI, OF CUDAHY, WISCONSIN, ASSIGNOR OF ONE-HALF TO JOSEPH ROMANOWSKI, OF CUDAHY, WISCONSIN.

BOILER.

1,255,014.  Specification of Letters Patent.  Patented Jan. 29, 1918.

Application filed July 9, 1917. Serial No. 179,382.

*To all whom it may concern:*

Be it known that I, WACLAW JANISZEWSKI, a citizen of Russia, residing at Cudahy, in the county of Milwaukee and State of Wisconsin, have invented certain new and useful Improvements in Boilers, of which the following is a specification.

This invention relates to new and useful improvements in boilers.

The primary object of the invention is the provision of a boiler useful for general purposes either for cooking vegetables or for boiling any other articles, the structure being such as to mechanically elevate the articles within the boiler instantly whenever desired.

A further object of the device is the provision of a boiler that is easy and inexpensive to manufacture, the same having an adjustable tray normally arranged therein and resiliently mounted when in its elevated position.

With these general objects in view and others that will appear as the nature of the invention is better understood, the same consists in the novel combination and arrangement of parts hereinafter fully described and illustrated in the accompanying drawing and then claimed.

In the drawing forming a part of this application like reference characters designate corresponding parts throughout the several views in which Figure 1 is a vertical, central, sectional view through the device.

Fig. 2 is a side elevation of a portion of the same with the tray slightly elevated and with a part shown in vertical section.

Fig. 3 is a top plan view of a side portion of the device and

Fig. 4 is an enlarged detail sectional view of one of the retaining latches for the tray.

It being understood that the boiler herein set forth is especially adapted for cooking vegetables, the same broadly consists of a kettle or a container 10 having a tray 11 upon which the vegetables are placed adjustably positioned therein. Oppositely arranged handles 12 are carried by the kettle 10 projecting upward from the rim 13 thereof with outwardly radially projecting loops 14 at their ends.

Inverted U-shaped rods 15 are arranged slidably extending through suitable slots 16 in ecah of the handle portions 12 and spanning the edge of the kettle 10 with arms 17 thereof depending inwardly of the kettle and attached at opposite points to the tray 11, whereby the latter is suspended within the kettle. The other arms 18 of the members 15 are arranged outwardly of the kettle depending beneath the handles 12 and freely arranged through perforations 19 in opposite laterally projecting plates 20 carried by the adjacent outer sides of the kettle beneath the handles. Helical springs 21 are mounted upon the plates 20 and surround the arms 18, while pins 22 are carried by said arms and are seated upon the springs 21.

A retaining latch 23 pivotally arranged beneath each of the handles 12 has a swinging movement within the path of travel of the adjacent arm 18 and is adapted to engage within one of a plurality of side notches 24 with which said arm is provided. It will be understood that when the latches 23 are released, the springs 21 will extend and move the pins 22 to a position substantially in the same plane as the handle 12, at which time the tray 11 will be resiliently supported. The tray 11 may be then depressed against the action of the springs 21 until it has reached its desired lowered position and, the latches 23 being then brought into engagement with the adjacent notches 24, the tray is rigidly retained in such position within the kettle 10.

During the cooking operation, the articles may be positioned upon the tray 11 and then lowered into the kettle 10. When desired, the latches 23 may be swung to their released positions, whereupon the springs 21 mechanically elevate the tray 11 to a point adjacent the level of the kettle rim 13. Slots 25 are arranged in the handles 12 for permitting the passing of the pins 22 therethrough when it is desired to detach the tray from the rods 15, it being noted that the lower ends of the rod arms 17 are slidably arranged through peripheral slots 26 in the holder 11 and are provided with headed ends 27 upon which the holder is seated.

The complete operation of the device will be apparent from this detailed description thereof, with respect to the mechanical elevating of the tray 11, the adjustment thereof and the manner of removing the tray from the kettle. While the present form of the device is believed to be preferable, minor changes may be made therein if desired without departing from the scope of the appended claims.

What I claim is:—

1. A boiler comprising a kettle, projecting handles for said kettle, inverted U-shaped rods spanning opposite portions of said kettle and slidably arranged through said handles, a tray attached to said rods within the kettle, elevating springs operatively connected to said rods and adjustment retaining means for said rods.

2. A boiler comprising a kettle having opposite handles, plates carried by the kettle beneath said handles, U-shaped rods having their adjacently positioned arms arranged within the kettle and with their other arms slidably arranged through said handles and plates outside of the kettle, a tray detachably connected to the lower ends of said rods within the kettle, springs encircling said other rod arms and seated upon said plates, pin connections between said springs and rods and adjustment retaining latches for said rods pivoted beneath said handles.

3. A boiler comprising a kettle having opposite handles, plates carried by the kettle beneath said handles, U-shaped rods having their adjacently positioned arms arranged within the kettle and with their other arms slidably arranged through said handles and plates outside of the kettle, a tray detachably connected to the lower ends of said rods within the kettle, springs encircling said other rod arms and seated upon said plates, pin connections between said springs and rods, said handles being provided with slots adapted for the passage of said pins therethrough, said rods having spaced notches in the outer arms thereof, and swinging latches secured to said handles adapted for reception within said notches to retain the tray in its adjusted positions.

In testimony whereof I affix my signature.

WACLAW JANISZEWSKI.

Copies of this patent may be obtained for five cents each, by addressing the "Commissioner of Patents, Washington, D. C."